this invention relates…

United States Patent Office 3,580,880
Patented May 25, 1971

3,580,880
DISPERSIONS OF PARTICULATE SOLIDS IN EITHER LIPOPHILIC OR HYDROPHILIC LIQUIDS STABILIZED WITH A POLYMERIC AMPHIPATHIC STABILISER AND PROCESS FOR PREPARING SAID DISPERSIONS
Michael Raymond Clarke and Leon Filipowicz, Melbourne, Victoria, Australia, assignors to Balm Paints Limited, Melbourne, Victoria, Australia
No Drawing. Filed Nov. 20, 1967, Ser. No. 684,545
Claims priority, application Great Britain, Nov. 25, 1966, 52,826/66
Int. Cl. C08f 45/24; C08g 53/18; C08j 1/46
U.S. Cl. 260—29.6R                             16 Claims

ABSTRACT OF THE DISCLOSURE

A process of preparing stable dispersions of particulate solids in either lipophilic or hydrophilic liquids by dispersing the solids in the liquid in the presence of a polymeric amphipathic stabiliser which associates with the surface of the particles and provides a solvated steric barrier around them. The stabilisers comprise at least one chain-like component solvatable by a lipophilic liquid and with a chain-length equivalent to at least 12 covalent links together with at least one component solvatable by a hydrophilic liquid, each component being present in the weight proportion of at least 25% of the total weight of stabiliser. The stabilisers may comprise up to 10% by weight of ionizable groups, preferably co-reacted with counter-ions solvatably by a hydrophilic liquid.

---

This invention relates to dispersions of particulate solids in media which may be either lipophilic or hydrophilic, to particulate solids so-dispersed and to stabilisers for use therein.

By a lipophilic liquid we mean an organic liquid which does not exhibit hydrogen bonding, for example aliphatic and aromatic hydrocarbons such as hexane, octane, benzene and other alkyl benzenes, or an organic liquid which is only moderately hydrogen bonded, for example alkyl and aryl esters, ketones and ethers, such as ethyl acrylate, butyl acrylate, dimethyl ketone, butyl glycol ether and diglycol ethyl ether. By a hydrophilic liquid we mean water and strongly hydrogen bonded organic liquids which are completely miscible with water, for example ethylene glycol, methyl alcohol and ethyl alcohol.

We now provide stable dispersions of particulate solids in either lipophilic or hydrophilic liquids in which the solids are insoluble and in which the disperse particles are stabilised by a polymeric amphipathic stabiliser which associates with the surface of the disperse particles the said stabiliser comprising one or more components which in the presence of a lipophilic liquid are solvated by the liquid and provide around the disperse solid particles a stabilising steric barrier at least 12 A. thick together with one or more components which in the presence of a hydrophilic liquid are solvated by the liquid and entropically stabilise the disperse solid particles, the components solvatable by a lipophilic liquid and the components solvatable by a hydrophilic liquid being each present in the stabiliser in a proportion of at least 25% of the total weight of stabiliser.

We also provide a process of stabilising dispersions of particulate solids in either lipophilic or hydrophilic liquids in which the solids are insoluble by dispersing the solids in the liquid in the presence of a polymeric amphipathic stabiliser comprising at least one component which in the presence of a lipophilic liquid is solvated by the liquid and provides around the disperse solid particles a stabilising steric barrier at least 12 A. thick together with at least one component which in the presence of a hydrophilic liquid is solvated by the liquid and entropically stabilizes the disperse solid particles, the components solvatable by a lipophilic liquid and the components solvatable by a hydrophilic liquid being each present in the stabiliser in a proportion of at least 25% of the total weight of stabiliser.

We further provide a process of preparing powdered particulate solids dispersible in either lipophilic or hydrophilic liquids by first preparing a stable dispersion of particulate solids as described above and then removing the liquid.

By entropic stabilisation of disperse particles we mean that the particles are surrounded by a sheath of components solvated by a hydrophilic liquid the solvated components it is believed being further hydrogen bonded to a cloud of hydrophilic liquid as described by Brown, G. L., Am. Chem. Soc., Division of Organic Coatings and Plastics Chemistry, "Papers Presented at the Detroit Meeting, April 1965" 25, No. 1, and which barrier so-formed sterically stabilises the dispersion.

The particulate solids may be organic or inorganic, preferably with a mean particle diameter of less than 2 microns, more preferably below 0.5 micron. They may be natural or synthetic polymers or pigmentary powders.

In one embodiment of this invention the particulate solids are synthetic polymer derived from $\alpha,\beta$-ethylenically unsaturated monomer and in this embodiment we prefer to produce the dispersions of polymer particles by polymerisation of monomer in the liquid in the presence of the amphipathic stabiliser which associates with and stabilises the disperse polymer particles so-formed.

When the particulate solid is a synthetic polymer produced by polymerisation of monomer in the liquid of the dispersion the liquid must be inert with respect to the polymerisation reaction and must not interfere with the association between the stabiliser and the disperse polymer particles.

The amphipathic stabiliser provides within the one molecule components which associate with the disperse particles together with components which provide a stabilising barrier around the particles and carry out these functions in either a lipophilic or a hydrophilic liquid. It is a feature of our invention that in the stabilisers which we provide certain components may each perform two of these functions depending on the liquid in which the solids are dispersed and in fact in one embodiment the stabiliser comprises only two components which in combination perform all four of the above-mentioned functions. When the disperse particles are particles of synthetic polymer the solvatable components of the stabiliser must be of different polarity to that of the synthetic polymer since the disperse particles must be insoluble in the liquid of the dispersion. This requirement means that the solvatable components of the stabiliser will per se be essentially incompatible with the disperse polymer although they may appear to show a limited compatibility therein in certain proportions.

The association between the disperse particles and the stabiliser is primarily a mass-dependent force. For example in the presence of a lipophilic liquid the components of the stabiliser solvatable by a hydrophilic liquid (hydrophilic components) are in a collapsed or coiled state and in this configuration they provide a mass-dependent associative force between the stabiliser and the disperse solid. On the other hand, in the presence of a hydrophilic liquid it is the components of the stabiliser solvatable by a lipophilic liquid (lipophilic components)

which are in a collapsed or coiled state and associate with the disperse particles.

In certain circumstances this mass-dependent force may be supplemented by strong forces generated between certain types of polar groups. For example if the disperse particles are suitably polar and the stabiliser contains complementary polar groups, then in the presence of a lipophilic liquid the mass-dependent associative force between the stabiliser and the disperse particles may be supplemented by specific polar interaction between polar groups in the stabiliser and complementary polar groups in the disperse particles, as described in the co-pending British application No. 6,289/65, the disclosures of which are related to and understood to be incorporated in the present application. In the said application the disperse particles are synthetic polymer particles but if for example the disperse particles are inorganic solids providing similar polar groups the same mechanism will obtain.

In the presence of a lipophilic liquid the lipophilic components of the stabiliser provide a steric barrier around the disperse particles in the form of random extended tails or coils or loops solvated by the lipophilic liquid, the tails or coils or loops being attached at one or both ends to the disperse particles by components of the stabiliser which associate therewith. The thickness of the steric barrier is determined by the effective length of such tails, coils or loops and as stated above the barrier must be at least 12 A. thick.

When the lipophilic components of the stabiliser are pendent components, that is chain-like components attached at one end to the stabiliser molecule, a barrier of the required thickness is provided by lipophilic components with a chain-length of at least 12 A. which is equivalent to about 12 covalent links, preferably not less than 16 A. which is equivalent to about 16 covalent links. The lipophilic component may be a solvated coil or loop, that is a segment of the stabiliser molecule attached at each end to a component of the stabiliser which associates with the disperse polymer. In order to provide a solvated steric barrier at least 12 A. thick such a component should be a segment of not less than 30 A. which is equivalent to about 30 covalent links. The lipophilic components are not necessarily all of the same length. They may be linear or branched.

In the presence of a hydrophilic liquid the hydrophilic components of the stabiliser are in an extended condition in random coils or loops or tails, hydrogen bonded to a cloud of hydrophilic liquid and in this condition they entropically stabilise the disperse polymer particles.

The hydrophilic components of the stabiliser comprise non-ionic chain-like components with a molecular weight of 350–5000, preferably 1000-5000 optionally together with ionizable groups provided that the total weight of ionizable groups in the stabiliser molecule does not exceed 10% by weight, preferably not more than 5% by weight of the stabiliser. The chain-like non-ionic components of the stabiliser may be linear or branched and when the stabiliser comprises more than one such component, the said components are not necessarily all of the same chain-length. When the stabiliser contains ionizable groups we prefer that the said groups be co-reacted with counter-ions as hereinunder defined.

The dispersions may be formed by adding the stabiliser to the particulate solid and then adding the mixture so-formed to the liquid of the dispersion. Alternatively the particulate solid may be formed in or added to the liquid in the presence of the stabiliser.

The degree to which a chain-like component is solvated by a particular liquid depends on the degree of hydrogen bonding of the component relative to that of the liquid and its degree of hydrogen bonding in turn depends on the nature of the links of the chain itself and of the atoms or groups attached thereto. If the components and liquid exhibit a similar degree of hydrogen bonding then in general the components will be solvated by and freely extended in the liquid; in such a liquid stabiliser associated with disperse solid particles can provide a steric barrier of solvated component. If the components exhibit dissimilar degrees of hydrogen bonding relative to the liquid then the components would be relatively non-solvated, if solvated at all, and would be in a collapsed or closely coiled state in which they could not provide an adequate stabilising barrier around the particles. The choice of chain-like component is therefore related to the nature of the liquid by which it is to be solvated. For example where the lipophilic liquid is non-hydrogen bonded e.g. an aliphatic or aromatic hydrocarbon, the chain-like lipophilic component of the stabiliser should also be non-hydrogen-bonded and where the lipophilic component is moderately hydrogen bonded, e.g. a ketone, ester or ether, the lipophilic chain-like component should exhibit a similar degree of hydrogen bonding. When the liquid is hydrophilic the hydrophilic component of the stabiliser should be strongly hydrogen bonded.

The particulate solids may be natural or synthetic polymers. For example they may be moderately or highly polar polymers such as the condensation products of di- or poly-carboxylic acids with di- or polyols; di- or poly-carboxylic acids with di- or poly-amines; caprolactam condensates of the nylon-6 type; polyester amides; polyurethanes comprising the reaction products of diisocyanates with di- or polyols; polyethers; polyesters or polyester amides; epoxy resins; polyamides; polyureas; polysulphides; polyimides; polysulphones; polyoxymethylenes; polyacetals; polycarbonates or ionic salts such as nylon 66 salt.

The synthetic polymers may be polymers derived from ethylenically unsaturated monomers. Moderately polar polymers are, e.g. those derived from, as the major monomer, esters of unsaturated acids with lower alcohol, e.g. acrylic, methacrylic, ethacrylic and itaconic acid esters of methyl, ethyl, and butyl alcohol. Similar moderately polar polymer is produced from, as major monomer, an ester or ether of an unsaturated lower alcohol, e.g. vinyl alcohol. The esters may be of hydrofluoric acid and lower aliphatic carboxylic acids, e.g. acetic, chloracetic, propionic and formic. When higher acids are used they may be dicarboxylic acids such as oxalic acid, the second carboxylic group being left free or a proportion being esterified with a lower alcohol, e.g. methyl or ethyl alcohol. The unsaturated ethers may be simple ethers of a lower 1–4 C alkanol, e.g. methyl, ethyl, propyl and butyl vinyl ethers. Less polar polymers are produced from higher esters of unsaturated acids or alcohols, e.g. lauryl methacrylate, 2-ethyl hexyl acrylate or vinyl stearate or from unsaturated hydrocarbons such as vinyl benzenes and isoprene.

More highly polar polymers may be made by polymerisation or copolymerisation of highly polar polymers such as the above-mentioned unsaturated acids themselves or their polar derivatives such as acid chloride, amides or methylolamides but bearing in mind that the particulate solid must be insoluble in both lipophilic and hydrophilic liquids such monomers usually comprise only a minor proportion, say up to 10% of the polymer.

Polymers which are crystalline and therefore insoluble in the liquids to be used in accordance with this invention are those of vinyl chloride, vinylidene chloride, acrylonitrile, methacrylonitrile, ethylene and (stereo-regular polymer) propylene.

The particulate solids may be pigmentary powders, for example:

Organic monoazo compounds, e.g. C.I. Pigment Red 3, 4 and 6, C.I. Pigment Yellow 1 and 3;
Quinacridone pigments, e.g. C.I. Pigment Violet 19;
Anthraquinone pigments, e.g. C.I. Vat Yellow 1;
Organic/inorganic compounds, e.g. C.I. Pigment Red 48 and C.I. Pigment Green 10;
Copper phthalocyamine pigments, e.g. Pigment Blue 15 and Pigment Green 7.

The C.I. numbers refer to the classified groups of pigments as set out in "The Society of Dyers and Colorists, Colour Index," Second Edition and Supplement, 1963.

Other suitable particulate solids are provided by:

zinc oxide, magnesium oxide, titanium dioxide, aluminium oxide, oxides and hydrated oxides of aluminium, iron oxides, blanc fixe, barytes, calcium carbonate and the kaolin minerals, e.g. kaolinite and dickite.

Suitable chain-like components solvatable by a lipophilic liquid are described in the above-mentioned copending application. The essential requirement is that the component per se before incorporation into the stabiliser molecule should be completely soluble in the liquid.

Non-ionic chain-like components solvatable by a hydrophilic liquid and suitable for use according to this invention are components which are per se soluble in the hydrophilic liquid and as mentioned previously they must have a molecular weight of not less than 350, preferably not less than 1000. Suitable components are for example:

polyalkylene oxides, e.g. polyethylene oxides and copolymers of ethylene oxide with propylene oxide containing not less than 40% of ethylene oxide;
polyvinyl alcohol and copolymers of vinyl alcohol with vinyl esters and/or acetals containing not less than 75% of vinyl alcohol;
polyamides e.g. poly(acrylamide), poly(methacrylamide), poly(vinyl pyrrolidone) and copolymers of unsaturated amides with not more than 50% of alkyl vinyl ethers, e.g. methyl vinyl ether.

When a component solvatable by a hydrophilic liquid is an ionizable group, which is preferably co-reacted with a counter-ion as hereinunder described, suitable groups are for example:

acid groups, e.g. carboxyl, sulphate, sulphonate and phosphate groups;
basic groups, e.g. amine and quaternary ammonium groups.

The preferred groups are carboxyl, sulphate and amine groups.

The counter-ion should be soluble per se in the hydrophilic liquid and preferred counter-ions are those ions which are highly solvated by the liquid and which provide a bulky entropic barrier by hydrogen bonding to the liquid. For example a sodium ion is relatively poorly solvated by a hydrophilic liquid whereas a lithium ion solvates readily and provides a bulky, preferred counter-ion. Similarly ammonium and n-butyl amino ions are examples of non-preferred and preferred counter-ions respectively.

The preferred counter-ions are:

n-butyl amino, triethylamino, trimethylamino, diethanolamino and ethanolamino;
lithium;
ions provided by poly(ethylene oxide) adducts of primary and secondary amines in which the poly(ethylene oxide) chain contains not less than five ethylene oxide repeating units.

The stabilisers may be produced for example by the methods described in the above-mentioned application.

A stabiliser comprising one lipophilic component and one hydrophilic component may be formed by co-reacting equimolar proportions of a poly(hydroxy stearic acid) with a hydroxyl-terminated poly(ethylene oxide).

A stabiliser containing a single chain-like lipophilic component bearing a plurality of pendent hydrophilic components is formed by random copolymerisation of 60 parts of lauryl methacrylate with 40 parts of an acrylic acid ester of a mono methoxy ethylene oxide/propylene oxide co-condensate of molecular weight 2600.

Random copolymerisation of poly(12-hydroxy stearic acid) methacrylate with mono methoxy poly(ethylene oxide) acrylate provides a stabiliser comprising a plurality of pendent lipophilic components together with a plurality of pendent hydrophilic components distributed along an essentially carbon-carbon backbone.

A variation of this method which we have found to be particularly useful when the hydrophilic components are poly(alkylene oxides) is to concurrently form the hydrophilic components from monomeric alkylene oxides and attach them to a polymeric compound providing lipophilic components together with chemically reactive sites to which the poly(alkylene oxides) will graft. Suitable reactive sites are groups providing a reactive hydrogen, for example a carboxyl, hydroxyl or amine group. The chosen alkylene oxide monomer or mixture of alkylene oxide monomers is added to a solution of such a polymeric compound in the presence of a catalyst and under reaction conditions known to favour the polymerisation of alkylene oxides. Monomer polymerisation and grafting of the polymer so-formed to the reactive sites takes place concurrently.

Ionizable groups may be introduced into the stabiliser molecule by copolymerising therein a monomer providing the required groups. Alternatively the groups may be formed in the stabiliser by first introducing therein a comonomer providing suitable pendent reactive groups which are subsequently converted to the desired ionizable groups. For example amine groups may be provided by using as a comonomer dimethyl aminoethyl methacrylate or vinyl pyridene. Similarly acid groups are provided by for example (meth)acrylic acid, itaconic acid or maleic acid. By using as a co-monomer a proportion of glycidyl methacrylate sulphate groups may be introduced into the stabiliser by reaction of the epoxide groups of the polymer so-formed with sulphuric acid.

Co-reaction of ionizable groups with counter-ions is carried out at any convenient stage of manufacture of a dispersion and requires no special technique. For example a stabiliser molecule containing unreacted carboxyl groups may be prepared in a lipophilic liquid and subsequently neutralised with trimethylamine. Alternatively the said unreacted stabiliser molecule may be added to a hydrophilic liquid containing triethylamine, which reacts with the carboxyl groups as the acidic stabiliser molecule disperses in the liquid.

The dispersions of this invention may be formed by adding stabiliser to either a lipophilic or hydrophilic liquid or to the particulate solid and then adding the solid to the liquid optionally in the presence of wetting agents and preferably with agitation of the liquid. As the particulate solid disperses in the liquid the stabiliser associates with and stabilises the disperse particles.

Alternatively the particulate solid may be formed in the liquid in the presence of the stabiliser. For example an aluminum trialkyl may be hydrolysed in the presence of the stabiliser in either a lipophilic or a hydrophilic liquid to produce a stable dispersion of aluminium oxide in the liquid.

When the particulate solid is a synthetic polymer derived from ethylenically unsaturated monomer the dispersions of this invention may be made by polymerising monomer in either a lipophilic or a hydrophilic liquid in the presence of the stabiliser to produce the polymer which, being insoluble in the liquid, forms disperse particles which become stabilised by the stabiliser. The polymerisation may be carried out by conventional dispersion polymerisation initiators. In general the presence of ionizable groups in the stabiliser co-reacted with counter-ions tends to produce finer particle-size disperse polymer particles compared with those formed in the presence of a non-ionic stabiliser.

In a particularly preferred embodiment of the invention a dispersion of the particulate solid is first made in either a lipophilic or hydrophilic liquid in the presence of the stabiliser and the liquid subsequently removed to provide a powder dispersbile in either lipophilic or hydrophilic liquids in which the solid is insoluble. The liquid is removed by any suitable means, for example by evaporation by heating at a temperature below the softening or decomposition temperature of the particulate solid, optionally under vacuum.

In this embodiment of the invention it is necessary to ensure that the powder is readily wet by the liquid in which it is to be re-dispersed. Powders which are essentially non-ionic may, in particular, be difficult to wet out and their rate of dispersion may be increased by adding to the liquid and/or the powder a bridging solvent and/or a minor amount, for example 0.5 to 2.0% of a conventional wetting agent. By a bridging solvent we mean a water-soluble organic liquid which is also soluble in lipophilic liquids. For example the bridging solvent may be methyl pyrrolidone, ethyl carbamate or propylene carbonate.

When the particulate solid bears ionizable groups available at the surface of the solid, for example it may be a synthetic polymer particle having carboxyl groups accessibly disposed at its surface, dispersible powders derived therefrom usually wet out readily and especially when the ionizable groups are co-reacted with a counter-ion as defined above.

Alternatively, and this is a desirable feature of our invention when the particulate solid is essentially non-ionic, the stabiliser is suitably modified to facilitate wetting of the powder by the liquid of the dispersion. In this embodiment of our invention we prefer to use stabilisers which provide ionizable groups, preferably co-reacted with counter-ions as described above. The counter-ions may be added to the liquid in which the powder is to be dispersed or the co-reaction of ionizable groups and counter-ions may take place before the dispersion of particulate solid is dried to form the powder.

When the stabiliser is an addition copolymer derived from $\alpha,\beta$-ethylenically unsaturated monomers wetting of the powder by the liquid in which it is to be dispersed is favoured by the use of stabiliser in which 5-30% of the so-polymerised monomer is a medium hydrogen bonded monomer of molecular weight less than 200, for example hydroxy ethyl methacrylate, hydroxy propyl methacrylate, methyl methacrylate and vinyl acetate. For example a powder incorporating as a stabiliser a 1:1 (by weight) co-polymer of a methacrylate ester of a self-ester of 12 hydroxy stearic acid and as co-monomer a poly(ethylene glycol) methacrylate is usually more difficult to wet out than a similar powder in which the stabiliser is a copolymer of the above two comonomers together with 30% by weight of methyl methacrylate.

The amount of stabiliser required according to this invention will vary with the size and specific surface area of the disperse solid particles. Usually more stabiliser is required when the disperse particles are prepared in the presence of the stabiliser than when pre-formed particles are to be dispersed and stabilised. When the disperse particles are formed in the presence of the stabiliser and advantage of our process is that the size of the particles formed, especially when they are particles of synthetic polymer, can be pre-determined by the proportion and nature of the stabiliser used. In general, the proportion of stabiliser required is from 0.1 to 10.0% of the weight of the disperse particles; from 5 to 10% being suitable for example for particles of about 0.1 micron in size and from 0.5 to 2.0% being suitable for example for particles of about 1.0 micron size.

The invention is illustrated by the following examples, in which all parts are by weight:

EXAMPLE 1

Preparation of a methyl methacrylate/methacrylic acid copolymer dispersion in a lipophilic liquid.

A self polyester of 12-hydroxy stearic acid of molecular weight about 1700 condensed with glycidyl methacrylate to introduce a polymerisable double bond (hereinafter referred to as monomer A) was copolymerised with the acrylic acid ester of a methoxy poly(ethylene oxide) of molecular weight about 750 (hereinafter referred to as monomer B) and methacrylic acid in the ratio of 72:24:2 in the presence of an aliphatic hydrocarbon liquid of boiling range 150–170° C. A 39% solution of a polymeric stabiliser of molecular weight about 30,000 was formed.

A mixture of 2.7 parts of the above stabiliser solution, 344 parts of aliphatic hydrocarbon (boiling range 60–80° C.), 60 parts of aliphatic hydrocarbon (boiling range 150–170° C.), 20 parts of methyl methacrylate, 0.4 part of methacrylic acid and 1.5 parts of azodiisobutyronitrile were added to a reaction vessel, heated to reflux for 20 minutes. A fine cloud of disperse polymer formed. The following mixture:

| | Parts |
|---|---|
| Stabiliser solution (above) | 86.8 |
| Methyl methacrylate | 470.0 |
| Methacrylic acid | 9.4 |
| Azodiisobutyronitrile | 1.5 |
| Primary octyl mercaptan (10% solution in aliphatic hydrocarbon) | 15.0 | was then added at a uniform rate over a period of 3 hours to the refluxing contents of the reaction vessel in such a manner that the mixture feed was well diluted by the reflux return. Refluxing was continued for a further 30 minutes. A stable 50% solids dispersion of a 98:2 methyl methacrylate/methocrylic acid copolymer particles of 0.4 to 1.0 micron diameter was obtained.

EXAMPLE 2

In this example the stabiliser of Example 1 is used to prepare a dispersion of methyl methacrylate/methacrylic acid copolymer in a hydrophilic liquid.

The following mixture:

| | Parts |
|---|---|
| Stabiliser solution (from Example 1) | 60.90 |
| Methyl methacrylate | 7.35 |
| Methacrylic acid | 0.15 |
| Azodiisobutyronitrile | 0.50 |
| Deionized water | 300.00 | was placed in a reaction vessel, purged with inert gas to remove oxygen and then heated in an inert atmosphere to 65–70° C. The temperature was held for 20 minutes, during which time a fine seed formed in the liquid. A mixture of:

| | Parts |
|---|---|
| Stabiliser solution (from Example 1) | 20.00 |
| Methyl methacrylate | 146.55 |
| Methacrylic acid | 2.95 |
| Azodiisobutyronitrile | 0.50 | was added at a uniform rate over a period of 3 hours to the charge, the temperature being maintained at 65–70° C. during the addition and for a further 20 minutes. A stable 19.2% solids dispersion of a 98:2 methyl methacrylate/methacrylic acid copolymer particles of 0.2–0.4 micron diameter was obtained.

EXAMPLE 3

A 36% solids solution in butanol/butyl acetate (3.64:1) of a polymeric stabiliser with a molecular weight of approximately 30,000 was prepared by the addition polymerisation in the solvent mixture of lauryl methacrylate and the acyrlic acid ester of a water-soluble mono methoxy poly(ethylene oxide/propylene oxide) of molecular weight 2600 (hereinafter referred to as monomer C) in the proportion of 65:35.

By the general method of Example 1 the above stabiliser was used to prepare a stable dispersion of a 97:3 copolymer of methyl methacrylate/methacrylic acid of mean particle diameter 0.1–1.0 micron and 50% total solids in an aliphatic hydrocarbon liquid.

EXAMPLE 4

A 39% solids solution in xylene/aliphatic hydrocarbon/ butanol (1:4:8) of a polymeric stabiliser with a molecular weight of approximately 30,000 was prepared by the addition polymerisation in the solvent mixture of monomer A, monomer B and methacrylic acid in the proportion of 50:48:2.

By the general method of Example 1 the above stabiliser solution was used to prepare a stable dispersion of a 98:2 copolymer of methyl methacrylate/methacrylic acid of mean particle diameter 0.4–1.0 micron and 50% total solids in an aliphatic hydrocarbon liquid.

EXAMPLE 5

A 41% solids solution in xylene/aliphatic hydrocarbon/butanol (0.3:1.2:1) of a polymeric stabiliser with a molecular weight of approximately 20,000 was prepared by the addition polymerisation in the solvent mixture of monomer A, monomer B and N-dimethyl aminoethyl methacrylate in the proportion of 66.8:16.6:16.6.

By the general method of Example 1 the above stabiliser solution was used to prepare a stable dispersion of a 97:3 copolymer of methyl methacrylate/methacrylic acid of mean particle diameter approximately 0.2 micron in an aliphatic hydrocarbon liquid.

EXAMPLE 6

A similar dispersion to that of Example 5 was prepared but substituting for the monomer B of the stabiliser an acrylic acid ester of a methoxy poly(ethylene oxide) of molecular weight about 350. A stable dispersion was again produced but the mean diameter of the disperse polymer particles was somewhat coarser than in Example 5, a proportion of the particles having a diameter of greater than 1.0 micron.

EXAMPLE 7

A 45% solids solution in xylene/aliphatic hydrocarbon/butanol (1:4:3) of a polymeric stabiliser with a molecular weight of approximately 20,000 was prepared by the addition polymerisation in the solvent mixture of monomer A and monomer B in the proportion of 1:1.

By the general method of Example 1 the above stabiliser solution was used to prepare a stable dispersion of poly (methyl methacrylate) of mean particle diameter 0.4–1.0 micron in a liquid comprising aliphatic hydrocarbon and ethanol in the proportion of 93:7.

EXAMPLE 8

A mixture of 488 parts of a 51.5% solution of monomer A in aliphatic hydrocarbon (boiling range 150–170° C.), 28 parts of glycidyl methacrylate, 100 parts of ethyl acetate and 0.24 part of azodiisobutyronitrile was added at a uniform rate over a period of 5 hours to a refluxing mixture of 100 parts of butyl acetate and 100 parts of ethyl acetate contained in a reaction vessel. A 34% solution of a copolymer of monomer A and glycidyl methacrylate was formed, the epoxide groups of the glycidyl methacrylate being unreacted and distributed along the polymeric chain so-formed.

A mixture of 600 parts of a water-soluble mono methoxy poly(ethylene oxide/propylene oxide) of molecular weight approximately 2,600 and 400 parts of xylene was refluxed in an apparatus fitted with a water trap to dehydrate the mixture, then 42.3 parts of phthalic anhydride were added and refluxing continued for a further 2 hours. A 62% solids solution of the phthalic half ester of the poly(ethylene oxide/propylene oxide) with an acid value of 25 mgrms. of KOH per grm. was formed.

A mixture of 390 parts of aliphatic hydrocarbon (boiling range 150–170° C.), 590 parts of the above epoxide containing copolymer solution, 516 parts of the above half ester solution, 0.3 part of hydroquinone and 0.6 part of a tertiary coconut oil fatty acids amine catalyst was heated in a reaction vessel to 130° C., stripping out reflux condensate in the process to maintain a steady reflux rate. This temperature was maintained for 4 hours, producing a 42% solution of a polymeric stabiliser of acid value less than 2 mgms. KOH per gm. The stabiliser formed was c—c polymeric chain bearing a plurality of pendent chain-like self-esters of poly(12-hydroxy stearic acid) and a plurality of pendent poly(ethylene oxide/propylene oxide) chains joined to the backbone by reaction of their half-esters with epoxide groups of the initial copolymer.

The following components:

|  | Parts |
|---|---|
| Aliphatic hydrocarbon (boling range 60–80° C.) | 344.4 |
| Stabiliser solution (from above) | 81.7 |
| Aliphatic hydrocarbon (boiling range 150–170° C.) | 60.0 |
| Methyl methacrylate | 20.0 |
| Azodiisobutyronitrile | 1.5 |
| n-Butanol | 30.0 | were added to a reaction vessel and heated to reflux for 20 minutes. A fine particle-size dispersion formed. To the reaction vessel was added a mixture of 15 parts of a 10% solution in an aliphatic hydrocarbon of primary octyl mercaptan, 470 parts of methyl methacrylate and 1.5 parts of azodiisobutyronitrile at a uniform rate over a period of 3 hours, the reflux being maintained and incoming feed being arranged to be well diluted by the reflux return. Refluxing was continued for a further 30 minutes. A stable 50% solids dispersion of poly(methyl methacrylate) in particles with a mean diameter of 0.4 micron was formed in the liquid, comprising aliphatic hydrocarbon and n-butanol in the proportion of 93:7.

EXAMPLE 9

A solution of a polymeric stabiliser was prepared by the addition polymerisation of monomer A, monomer C and methacrylic acid in the proportion of 74:24:2 in a mixture of aliphatic hydrocarbon/ethanol/propylene glycol (2:4.5:4.5)

The polymeric stabiliser so-formed was precipitated by the addition of an excess of aliphatic hydrocarbon, washed several times and then dissolved in xylene to give a 22% solids stabiliser solution.

The pH of the stabiliser solution so-formed was adjusted to 7.6 with triethylamine and then used by the general method of Example 1 to prepare a stable dispersion of a 75:25 copolymer of methyl methacrylate/2-ethyl hexyl acrylate of mean particle diameter about 0.5 micron and 50% total solids in a liquid comprising aliphatic hydrocarbon and n-butanol in the proportion of 93:7.

EXAMPLE 10

A similar stable dispersion to that of Example 9 was prepared following the same procedure but with the ratios of monomers forming the stabiliser changed to 25:73:2 (monomer A/monomer C/methacrylic acid).

EXAMPLE 11

A 45% solids solution in xylene/aliphatic hydrocarbon/n-butanol (3.2:10.5:10.0) of a polymeric stabiliser with a molecular weight of approximately 30,000 was prepared by the addition polymerisation in the solvent mixtures of monomer A and monomer B in the proportion of 1:1.

By the general method of Example 1 the above stabiliser solution was used to prepare a stable dispersion of a 95:5 copolymer of methyl methacrylate/hydroxyethyl methacrylate with a particle diameter of 0.2–1.0 micron in a liquid comprising aliphatic hydrocarbon and hexylene glycol in the proportion of 93:7.

EXAMPLE 12

Similar stable dispersions to that of Example 11 were prepared following the same procedure but with the ratios of the monomers forming the stabiliser changed to monomer A/monomer B 3:1 and 1:3 respectively.

EXAMPLE 13

In this example the stabiliser of Example 3 is used to stabilse a dispersion of synthetic polymer in water.

A reaction vessel was charged with the following mixture:

|  | Parts |
|---|---|
| Stabiliser solution (from Example 3) | 7.6 |
| De-ionized water | 300.0 |
| Methyl methacrylate | 5.6 |
| 2-ethyl hexyl acrylate | 1.9 |
| Azodiisobutyronitrile | 0.5 | which was purged with inert gas to remove oxygen and then heated to 65–70° C. under an inert atmosphere. The temperature was held for 20 minutes during which time a fine dispersion formed. To the batch was then added the following mixture:

|  | Parts |
|---|---|
| Stabiliser solution (from Example 3) | 22.8 |
| Methyl methacrylate | 106.4 |
| 2-ethyl hexyl acrylate | 35.6 |
| Azodiisobutyronitrile | 0.5 | at a uniform rate over a period of 3 hours, maintaining the temperature at 65–70° C. during the addition and for a further 30 minutes. A 26% total solids stable disperison of a 75:25 copolymer of methyl methacrylate/2-ethyl hexyl acrylate of mean particle diameter 0.2 micron was formed.

EXAMPLE 14

The stabiliser solution of Example 8 was used, following the general method of preparation of Example 2 to prepare a 24% total solids stable dispersion in water of a 75:25 copolymer of methyl methacrylate/2-ethyl hexyl acrylate of mean particle diameter 0.1 micron.

EXAMPLE 15

In this example the stabiliser of Example 9 was used to prepare a stable aqueous dispersion of synthetic polymer in which the ionizable groups of the stabiliser were co-reacted with counter-ions.

The following mixture:

|  | Parts |
|---|---|
| Stabiliser solution (from Example 9) | 15.5 |
| De-ionized water | 300.0 |
| Methyl methacrylate | 5.6 |
| 2-ethyl hexyl acrylate | 1.9 |
| Azodiisobutyronitrile | 0.5 | were loaded into a reaction vessel and adjusted to a pH of 7.5 with ethanolamine, purged with inert gas to remove oxygen and heated under an inert atmosphere to 65–70° C. The temperature was held for 20 minutes during which time a fine particle-size dispersion formed. To this charge was added the following mixture, adjusted to a pH of 7.5 with ethanolamine:

|  | Parts |
|---|---|
| Stabiliser solution (from Example 9) | 46.5 |
| Methyl methacrylate | 106.4 |
| 2-ethyl hexyl acrylate | 35.6 |
| Azodiisobutyronitrile | 0.5 | at a uniform rate over a period of 3 hours. The temperature was maintained during the addition and for a further 30 minutes at 65–70° C. A stable 28% total solids dispersion of a 75:25 copolymer of methyl methacrylate/ 2-ethyl hexyl acrylate of mean particle diameter approximately 0.1 micron was formed.

EXAMPLE 16

Similar stable dispersions to that prepared in Example 15 were given when the procedure of that example was repeated but replacing the ethanolamine firstly with triethylamine and secondly with a tertiary amine formed by condensing a coconut oil fatty acids amine with an average 15 mols. of ethylene oxide to give a molecule with a molecular weight of about 860.

EXAMPLE 17

Redispersion in water and hydrocarbon of polymeric powder prepared from the stable dispersion of Example 11.

A sample of the dispersion of Example 11 was allowed to dry by evaporation in air of the volatile liquid of the continuous phase. A fine powder was produced.

A mixture of 1 part of the dry powder, 8 parts of de-ionized water, 1 part of a nonyl phenol/ethylene oxide condensate wetting agent and 20 parts of 3 mm. dia. glass beads were agitated in a glass jar in a laboratory vibratory shaker for 35 minutes. A stable dispersion of a 95:5 copolymer of methyl methacrylate/hydroxy ethyl methacrylate was formed.

The powder was similarly dispersible in a commercial hydrocarbon liquid containing 18% by weight of aromatic material.

EXAMPLE 18

Using the stabiliser of Example 8 and the general method of Example 1 a stable dispersion of a 98:2 copolymer of methyl methacrylate/methacrylic acid of mean particle diameter 0.3 micron was prepared in an aliphatic hydrocarbon liquid. A sample of the dispersion so-formed was allowed to dry by evaporation in air of the volatile liquid of the continuous phase. A fine powder was formed.

A mixture of 1 part of the dry powder, 8 parts of de-ionized water, 1 part of hexylene glycol and 20 parts of 3 mm. dia. glass beads was agitated in a glass jar in a laboratory shaker for 35 minutes. A stable dispersion of polymer particles in the aqueous liquid was formed. Examination of the dispersion under the electron microscope showed the particles to be deflocculated and of 0.3–0.4 micron diameter.

A similar dispersion was formed when the above procedure was repeated but replacing 1 part of the de-ionized water with triethylamine, wetting of the particles by the aqueous liquid being more rapid than when the amine was absent.

EXAMPLE 19

A 22% solution in aliphatic hydrocarbon/ethanol/propylene glycol (1:3:3) of a polymeric stabiliser with a molecular weight of approximately 30,000 was prepared by the addition polymerization in the solvent mixture of monomer A, monomer C and methacrylic acid in the proportion of 45:45:10.

A mixture of 200 parts of a pulverised nylon 66 of mean particle diameter less than 5 microns, 36 parts of the above stabiliser solution, 2 parts of a commercial antifoaming agent and 308 parts of a di-mineralized water was adjusted to a pH of 7.6 with triethylamine then agitated for 30 minutes in a laboratory high-speed stirrer. A stable, de-flocculated dispersion of nylon 66 in the aqueous liquid was formed.

EXAMPLE 20

A mixture of 200 parts of a pigment-grade r-titania with an inorganic oxide coated surface, 40 parts of the stabiliser solution of Example 9, 2 parts of a commercial anti-foaming agent and 91 parts of an aliphatic hydrocarbon (boiling range 230–250° C.) was adjusted to a pH of 7.5 with triethylamine and dispersed for 30 minutes at 2,000 r.p.m. in a sand mill. A fine, stable dispersion of r-titania in the lipophilic liquid was produced. Microscopic examination of the dispersion diluted with a large excess of the lipophilic liquid showed it to be deflocculated.

A mixture of 200 parts of the above pigment, 38 parts of the stabiliser solution of Example 9, 2 parts of a commercial anti-foaming agent and 68 parts of de-ionized water was adjusted to a pH of 7.5 with triethylamine and dispersed for 30 minutes at 2,000 r.p.m. in a sand mill. A fine, stable dispersion of r-titania in the hydrophilic liquid was produced. Microscopic examination of the dispersion diluted with a large excess of de-ionized water showed it to be deflocculated.

Similar dispersions were produced when the triethylamine above was replaced by n-butylamine.

EXAMPLE 21

The procedures of Example 20 were repeated but replacing the r-titania of that example with a pigment grade r-titania with an organic amine coating and the stabiliser solution with the stabiliser solution of Example 10.

Similar stable, deflocculated dispersions were again formed.

EXAMPLE 22

Preparation of a dispersion of a methyl methacrylate/ ethylene glycol monoethyl acrylate/tert. butyl aminoethyl methacrylate copolymer in a hydrophilic liquid.

The following components:

| | Parts |
|---|---|
| Aliphatic hydrocarbon (boiling range 150–160° C.) | 112 |
| Aliphatic hydrocarbon (boiling range 90–118° C.) | 40 |
| Dimethylformamide | 48 | were added to a reaction vessel and heated to reflux. (All liquids were dried before use in the reaction). Then to the reaction vessel was added a mixture of 146 parts of a 50% solution of an acetylated derivative of monomer A in aliphatic hydrocarbon (boiling range 150–160° C.), 4.1 parts of maleic anhydride, 31.5 parts of dimethylformamide, and 3.4 parts of azodiisobutyronitrile at a uniform rate over a period of 4 hours. Refluxing was continued for a further 2 hours.

A 20% solids solution of copolymer of acetylated derivative of monomer A, with maleic anhydride in the proportion 94.7:5.3 was obtained.

The following mixture:

| | Parts |
|---|---|
| Copolymer solution as prepared above | 192.5 |
| Water soluble mono methoxy terminated ethylene oxide/propylene oxide copolymer (84% solids in xylene) of molecular weight about 2600 | 65.3 | was placed in a closed glass vessel and stored in an air circulating oven at 110° C. for 16 hours. 45 parts of ethylene glycol diacetate was added and some of the solvent was distilled off under vacuum. A 50% solution of a polymeric stabiliser was obtained. The stabiliser formed was a c—c polymeric chain bearing a plurality of chain-like self ester of poly (12-hydroxy stearic acid) and a plurality of pendent poly(ethylene oxide/propylene oxide) chains joined to the backbone by reaction of their hydroxy group with anhydride group of the initial copolymer.

A mixture of:

| | Parts |
|---|---|
| Water | 150.0 |
| Propylene glycol | 100.0 |
| Azodiisobutyronitrile | 3.0 |
| Methyl methacrylate | 6.0 |
| Ethylene glycol monoethyl acrylate | 2.0 |
| Stabiliser solution (above) | 4.0 |
| Triethylamine | 0.5 |
| Ethyl alcohol | 26.0 |
| Acetone | 17.0 | was placed in a reaction vessel fitted with mechanical stirrer reflux condenser, purged with inert gas to displace the oxygen and heated under an inert atmosphere to 72°–73° C. This temperature was held for 20 minutes during which time a fine particle-size dispersion was formed.

The following mixture:

| | Parts |
|---|---|
| Methyl methacrylate | 127.8 |
| Ethylene glycol monoethyl acrylate | 50.0 |
| Azodiisobutyronitrile | 1.79 |
| Stabiliser solution (above) | 16.7 |
| Tert. butyl amino ethyl methacrylate | 1.28 | was added at a uniform rate to the contents of the reaction vessel over a period of four hours. The temperature of 72°–73° C. was maintained during this addition and for a further 30 minutes. A stable 40% solids dispersion of a 71.6:27.8:0.6 methyl methacrylate/ethylene glycol monoethylacrylate/tert. butyl amino ethyl methacrylate copolymer was obtained.

EXAMPLE 23

In this example the stabiliser of Example 22 is used to prepare a dispersion of methyl methacrylate/glycidyl methacrylate in an lipophilic liquid.

The following mixture:

| | Parts |
|---|---|
| Methyl methacrylate | 5.6 |
| Glycidyl methacrylate | 2.4 |
| Azodiisobutyronitrile | 0.4 |
| Butanol | 16.2 |
| Aliphatic hydrocarbon (boiling range 90–118° C.) | 50.9 |
| Aliphatic hydrocarbon (boiling range 60–90° C.) | 50.9 |
| Stabiliser solution from Example 22 | 2.36 | was placed in a reaction vessel and heated at reflux for 20 minutes. A fine cloud of disperse polymer formed.

The following mixture:

| | Parts |
|---|---|
| Methyl methacrylate | 28.92 |
| Glycidyl methacrylate | 12.40 |
| Azodiisobutyronitrile | 0.4 |
| Butanol | 8.0 |
| Stabiliser solution (from Example 22) | 9.0 |
| Primary octyl mercaptan (10% solution in aliphatic hydrocarbon) | 0.2 | was then added at a uniform rate over a period of 2 hours to the refluxing contents of the reaction vessel in such a manner that the mixture feed was well diluted by the reflux return. Reflux was continued for a further 30 minutes. A stable 30% solids dispersion of a 70:30 methyl methacrylate/glycidyl methacrylate was obtained.

EXAMPLE 24

Preparation of stable dispersions in lipophilic and hydrophilic liquids or r-titania. A 50% solids solution in ethylene glycol mono n-butyl ether of a polymer with a molecular weight of approximately 30,000 was prepared by the addition polymerisation in the above ether of monomer A, monomer C and glycidyl methacrylate in the proportion of 48:48:4.

The following mixture:

| | Parts |
|---|---|
| Polymer solution (from above) | 200 |
| Ethyl acetate | 140 |
| Acetone | 60 |
| Phosphoric acid (89% solution) | 3 | was reacted in a reaction vessel at 50° C. for 16 hours resulting in a 26% solid solution of polymeric stabiliser.

A mixture of 200 parts of a pigment grade r-titania surface coated with an organic amine, 28.6 parts of the above stabiliser solution adjusted to a pH of 7.5 with triethylamine and 94 parts of water was dispersed for 30 minutes at 2,000 r.p.m. in a sand mill. A uniform dispersion of r-titania in an aqueous liquid was obtained.

Similar dispersions were produced when water was replaced by propylene glycol, ethylene glycol mono n-butyl ether or 1:1 mixture of xylene/aliphatic hydrocarbon.

EXAMPLE 25

Preparation of stable dispersions in lipophilic and hydrophilic liquids of r-titania. A 25% solids solution in ethylene glycol mono n-butyl ether of a polymer with a molecular weight of approximately 30,000 was prepared by the addition polymerisation in the above ether of monomer A, monomer C and dimethyl amino-ethyl methacrylate in the proportion of 48:48:4.

The following mixture:

| | Parts |
|---|---|
| Polymer solution (from above) | 400.0 |
| Acrylic acid | 6.0 |
| Hydroquinone | 0.3 | was reacted in a reaction vessel at 140° C. for 1 hour resulting in a 25.5% solid solution of polymeric stabiliser.

By the general method of Example 24 stable dispersions of r-titania were produced in water, propylene glycol and 1:1 mixture of xylene/aliphatic hydrocarbon.

EXAMPLE 26

Preparation of a stable dispersion of poly(methyl methacrylate) in a mixture of aliphatic hydrocarbon and hexylene glycol. A 49% solids solution in xylene/aliphatic hydrocarbon/n-butanol (3.2:10.5:10.0) of a polymeric stabiliser with a molecular weight of approximately 30,000 was prepared by the addition polymerisation in the above solvent mixture of monomer A and an acrylic acid ester of a methoxypoly(ethylene oxide) of molecular weight about 350 in the proportion of 50:50.

The following components:

| | Parts |
|---|---|
| Aliphatic hydrocarbon (boiling range 60–80° C.) | 344.3 |
| Stabiliser solution (from above) | 54.0 |
| Aliphatic hydrocarbon (boiling range 150–170° C.) | 60.0 |
| Methyl methacrylate | 19.0 |
| Hydroxy ethyl methacrylate | 1.0 |
| Azodiisobutyronitrile | 1.5 |
| Hexylene glycol | 30.0 | were added to a reaction vessel and heated to reflux for 20 minutes. A fine particle-size dispersion formed. To the reaction vessel was added a mixture of: 15 parts of a 10% solution in an aliphatic hydrocarbon of primary actyl mercaptan, 304 parts of methyl methacrylate, 16 parts of hydroxy ethyl methacrylate and 1.0 part of azodiisobutyronitrile at a uniform rate over a period of 3 hours, the reflux being maintained and incoming feed being arranged to be well diluted by the reflux return. Refluxing was continued for a further 30 minutes. A stable 40% solids dispersion of a 95:5 copolymer of methyl methacrylate/hydroxyethyl methacrylate in particles with a mean diameter of 5 microns was formed in a liquid comprising aliphatic hydrocarbon and hexylene glycol in the ratio of 93:7.

EXAMPLE 27

Preparation of a stable dispersion of poly(methyl methacrylate) in an aliphatic liquid. A 42% solids solution in butanol/butyl acetate (3.64:1) of a polymeric stabiliser with a molecular weight of approximately 30,000 was prepared by the addition polymerisation in the above solvent mixture of lauryl methacrylate and monomer C in the proportion of 1:1.

By the general method of Example 26 but substituting butanol for the hexylene glycol of that example the above stabiliser was used to prepare a stable dispersion of a methyl methacrylate homopolymer of mean particle diameter 1.5–3.0 microns and 40% total solids in an aliphatic hydrocarbon liquid.

EXAMPLE 28

A similar stable dispersion to that of Example 10 was prepared following the same procedure but replacing the monomer C of that example with an acrylic acid ester of monomethoxy poly(ethylene glycol) of molecular weight about 3,000.

We claim:
1. Stable dispersions of particulate solids of mean particle diameter less than 2 microns in either lipophilic or hydrophilic liquids in which the solids are insoluble and in which the disperse particles are stabilized by 0.1 to 10.0% by weight of the particulate solids of a polymeric amphipathic stabilizer which associates with the surfaces of the disperse particles, the said stabilizer comprising at least one component which in the presence of a lipophilic liquid is solvated by the liquid and additionally is selected from the group consisting of chain-like pendent components of chain-length equivalent to at least 12 covalent links and solvated segments of the stabilizer molecule with a length equivalent to at least 30 covalent links together with at least one non-ionic chain-like component with a molecular weight of 350–5000 which in the presence of a hydrophilic liquid is solvated by the liquid and entropically stabilizes the disperse polymer particles, the components solvatable by a lipophilic liquid and the components solvatable by a hydrophilic liquid being each present in the stabilizer in a proportion of at least 25% of the total weight of stabilizer.

2. Stable dispersions according to claim 1 in which the particulate solids are polymer particles.

3. Stable dispersions according to claim 2 in which the polymer particles are synthetic polymer derived from $\alpha,\beta$-ethylenically unsaturated monomer.

4. Stable dispersions according to claim 2 in which the particulate solids are pigmentary powders.

5. Stable dispersions according to claim 1 in which the stabilizer contains up to 10% by weight of the stabiliser of ionizable groups.

6. Stable dispersions according to claim 5 in which the ionizable groups consist of at least one group selected from carboxyl, sulphate and amide groups.

7. Stable dispersions according to claim 5 in which the ionizable groups are co-reacted with counter-ions soluble per se in a hydrophilic liquid.

8. Stable dispersions according to claim 7 in which the counter-ions consist of at least one ion selected from the group consisting of n-butyl amino, triethylamino, trimethylamino, diethylamino, diethanolamino, ethanolamino and lithium ions and ions provided by poly(ethylene oxide) adducts of primary and secondary amines in which the poly(ethylene oxide) chain contains at least five ethylene oxide repeating units.

9. A process of stabilizing dispersions of particulate solids of mean diameter less than 2 microns in either lipophilic or hydrophilic liquids in which the solids are insoluble by dispersing the solids in the liquid in the presence of 0.1 to 10.0% by weight of said particulate solids of a polymeric amphipathic stabilizer which associates with the surfaces of the disperse particles, the said stabilizer comprising at least one component which in the presence of a lipophilic liquid is solvated by the liquid and additionally is selected from the group consisting of chain-like pendent components of chain-length equivalent to at least 12 covalent links and solvated segments of the stabilizer molecule with a length equivalent to at least 30 covalent links together with at least one non-ionic chain-like component with a molecular weight of 350–5000 which in the presence of a hydrophilic liquid is solvated by the liquid and entropically stabilizes the disperse polymer particles, the components solvatable by a lipophilic liquid and the components solvatable by a hydrophilic liquid being each present in the stabilizer in a proportion of at least 25% of the total weight of stabilizer.

10. A process according to claim 9 in which the particulate solids are polymer particles.

11. A process according to claim 10 in which the polymer particles are synthetic polymer derived from α,β-ethylenically unsaturated monomer by polymerisation of monomer in the liquid in the presence of the stabiliser.

12. A process according to claim 10 in which the particulate solids are pigmentary powders.

13. A process according to claim 10 in which the stabiliser contains up to 10% by weight of the stabiliser of ionizable groups.

14. A process according to claim 13 in which the ionizable groups consist of at least one group selected from carboxyl sulphate and amide groups.

15. A process according to claim 13 in which the ionizable groups are co-reacted with counter-ions soluble per se in a hydrophilic liquid.

16. A process according to claim 15 in which the counter-ions consist of at least one ion selected from the group consisting of n-butyl amino, triethylamino, trimethylamino, diethanolamino, ethanolamino and lithium ions and ions provided by poly(ethylene oxide) adducts of primary and secondary amines in which the poly(ethylene oxide) chain contains at least five ethylene oxide repeating units.

References Cited
UNITED STATES PATENTS

| | | | |
|---|---|---|---|
| 2,878,135 | 3/1959 | Willis | 106—308-O |
| 2,942,997 | 6/1960 | Bram et al. | 106—309 |
| 2,963,380 | 12/1960 | Leipen | 106—308-O |
| 3,382,297 | 5/1968 | Thompson | 260—34.2 |
| 3,397,166 | 8/1968 | Schmidle et al. | 260—33.6 |
| 3,101,374 | 8/1963 | Patton | 252—356 |
| 3,532,662 | 10/1970 | Ansdell | 260—34.2 |

ALLAN LIEBERMAN, Primary Examiner

U.S. Cl. X.R.

252—306, 308, 356; 260—29.6RB, 29.6RW, 29.6H, 29.6PM, 31.2R, 33.4R, 33.4EP, 33.4PQ, 33.4UR, 33.6R, 33.6EP, 33.6PQ, 33.6UB, 33.6UA, 34.2